United States Patent
Lee et al.

(10) Patent No.: US 11,523,427 B2
(45) Date of Patent: Dec. 6, 2022

(54) RANDOM ACCESS PERFORMING METHOD, AND DEVICE SUPPORTING SAME

(71) Applicant: LG Electronics Inc., Seoul (KR)

(72) Inventors: Youngdae Lee, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 156 days.

(21) Appl. No.: 16/608,467

(22) PCT Filed: Apr. 27, 2018

(86) PCT No.: PCT/KR2018/004942
§ 371 (c)(1),
(2) Date: Oct. 25, 2019

(87) PCT Pub. No.: WO2018/199693
PCT Pub. Date: Nov. 1, 2018

(65) Prior Publication Data
US 2021/0112591 A1    Apr. 15, 2021

Related U.S. Application Data

(60) Provisional application No. 62/491,372, filed on Apr. 28, 2017.

(51) Int. Cl.
*H04W 74/00* (2009.01)
*H04W 16/28* (2009.01)
*H04W 74/08* (2009.01)

(52) U.S. Cl.
CPC ......... *H04W 74/008* (2013.01); *H04W 16/28* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 2014/0376466 A1* | 12/2014 | Jeong | ................ | H04W 74/0833 370/329 |
| 2017/0207843 A1* | 7/2017 | Jung | .................... | H04B 7/0695 |
| 2017/0346543 A1* | 11/2017 | Islam | .................. | H04W 40/248 |
| 2019/0182682 A1* | 6/2019 | Kim | ....................... | H04B 7/0695 |
| 2019/0208547 A1* | 7/2019 | Koskela | ................ | H04W 24/10 |
| 2019/0268852 A1* | 8/2019 | Ryu | ..................... | H04W 56/001 |

FOREIGN PATENT DOCUMENTS

| | | |
|---|---|---|
| KR | 20150000304 A | 1/2015 |
| KR | 20150086445 A | 7/2015 |
| KR | 20150132200 A | 11/2015 |
| WO | 2015046895 A1 | 4/2015 |
| WO | 2017022112 A1 | 2/2017 |

* cited by examiner

*Primary Examiner* — Saumit Shah
(74) *Attorney, Agent, or Firm* — Dentons US LLP

(57) ABSTRACT

Provided is a method for performing a random access procedure by a terminal in a wireless communication system. The method comprises the steps of: selecting a first beam group including a configured number (M) of beams; transmitting a random access preamble to a base station via the first beam group; adjusting a value of M when it is determined that the random access procedure has failed; and reselecting a second beam group including the adjusted number of M beams.

12 Claims, 13 Drawing Sheets

RANDOM ACCESS PERFORMING METHOD, AND DEVICE SUPPORTING SAME

CROSS-REFERENCE TO RELATED APPLICATIONS

This application is the National Stage filing under 35 U.S.C. 371 of International Application No. PCT/KR2018/004942, filed on Apr. 27, 2018, which claims the benefit of U.S. Provisional Application No. 62/491,372 filed on Apr. 28, 2017, the contents of which are all hereby incorporated by reference herein in their entirety.

BACKGROUND OF THE DISCLOSURE

Field of the Disclosure

The present disclosure relates to a technology of performing a random access procedure in a new radio (NR) using a beam.

Related Art

In order to meet the demand for wireless data traffic since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

In order to achieve a high data rate, it is considered to implement a super high frequency (millimeter wave (mm-Wave)) band, e.g., 60 GHz band, in the 5G communication system. To decrease a propagation loss of a radio wave and increase a transmission distance in the super high frequency band, beamforming, massive multiple-input multiple-output (MIMO), Full Dimensional MIMO (FD-MIMO), array antenna, analog beamforming, and large scale antenna techniques are discussed in the 5G communication system.

In addition, in the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In addition, in the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Further, the 5G communication system is considered to be implemented in higher frequency bands so as to accomplish higher data rates. To decrease a propagation loss of a radio wave and increase a transmission distance of a radio wave in a super high frequency band, a beamforming technology has been discussed.

SUMMARY OF THE DISCLOSURE

Meanwhile, a terminal may use a beam in order to perform a random access procedure in the NR. Specifically, the terminal may select a beam for transmitting a random access preamble or a RRC connection request message. In this case, it is important to select an appropriate beam for performing the random access procedure successfully as quickly as possible.

The present disclosure provides a method for performing a random access procedure in a wireless communication system, the method including: selecting a first beam group including a set number M of beams; transmitting a random access preamble to a base station via the first beam group; adjusting a value of M in a case where it is determined that the random access procedure fails; and reselecting a second beam group including the adjusted number M of beams.

The method may further include transmitting the random access preamble to the base station via the second beam group.

The case where it is determined that the random access procedure fails may be any one of a case where a response corresponding to the random access preamble is not received while the random access preamble is transmitted by a set number of times or a case where it is determined that a contention resolution is not performed successfully.

The threshold value may be a value related to Reference Signal Received Power (RSRP) or Reference Signal Received Quality (RSRQ).

In the transmitting, the random access preamble may be transmitted using each of beams included in the first beam group at least once.

In the adjusting, the value of M may be adjusted so that a magnitude of M is increased.

The method may further include receiving configuration information related to a plurality of values of M from the base station, wherein in the adjusting, the value of M is adjusted so that a magnitude of M is increased.

The base station may be a base station of a target cell for which handover is to be performed.

The present disclosure also provides a terminal for performing a random access procedure in a wireless communication system, the terminal including: a memory; a transceiver; and a processor connecting the memory and the transceiver to each other, wherein the processor is configured to: select a first beam group including a set number M of beams; transmit a random access preamble to a base station via the first beam group; adjust a value of M in a case where it is determined that the random access procedure fails; and reselect a second beam group including the adjusted number M of beams.

The processor may be configured to transmit the random access preamble to the base station via the second beam group.

The case where it is determined that the random access procedure fails may be any one of a case where a response corresponding to the random access preamble is not received while the random access preamble is transmitted by a set number of times or a case where it is determined that a contention resolution is not performed successfully.

The threshold value may be a value related to Reference Signal Received Power (RSRP) or Reference Signal Received Quality (RSRQ).

The processor may be configured to transmit the random access preamble using each of beams included in the first beam group at least once.

The processor may be configured to adjust the value of M so that a magnitude of M is increased.

The processor may be configured to receive configuration information related to a plurality of values of M from the base station, and adjust the value of M so that a magnitude of M is increased.

According to an embodiment of the present disclosure, in a case where a random access procedure is delayed or fails, a beam transmitting a random access preamble is reselected by adjusting a threshold value, such that the random access procedure may be performed successfully as quickly as possible.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A and 5G. However, technical features of the present disclosure are not limited thereto.

Figure 1:
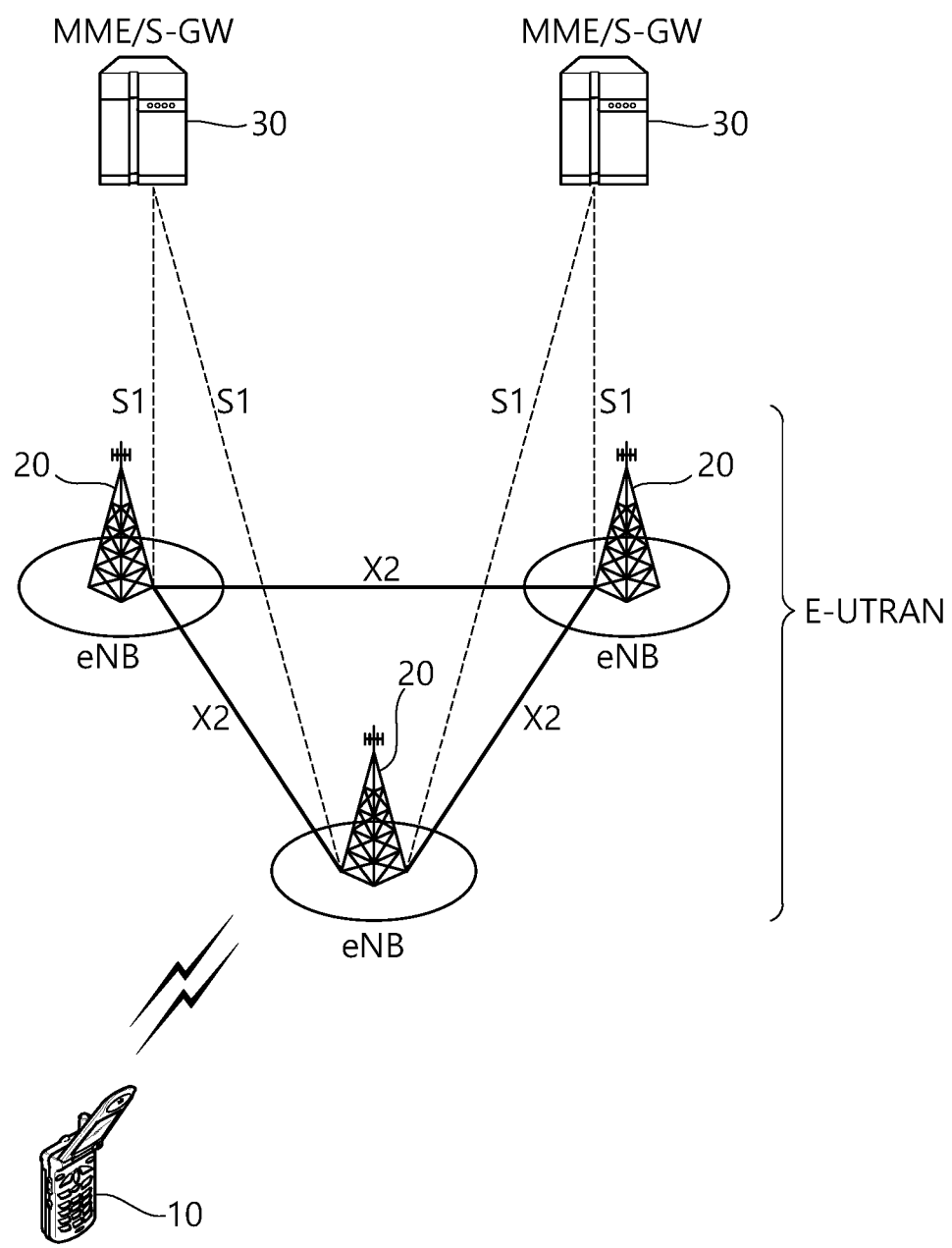
FIG. 1 shows long-term evolution (LTE) system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a serving gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-

GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
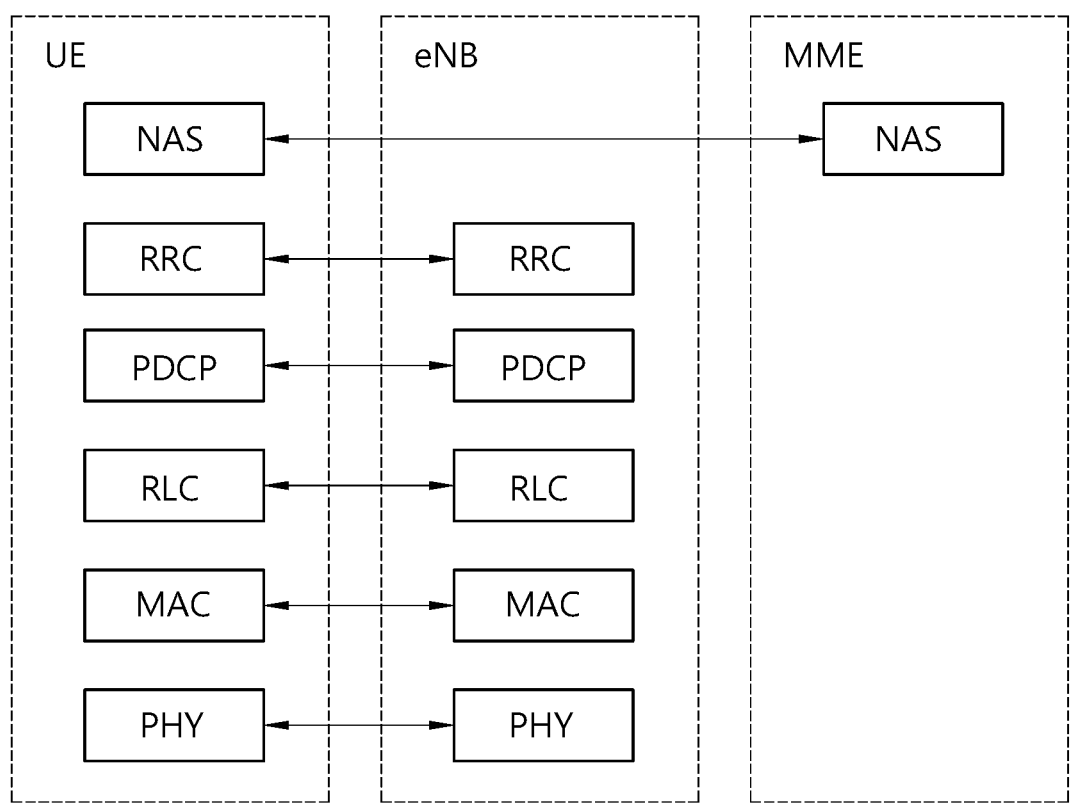
FIG. 2 shows a control plane of a radio interface protocol of an LTE system.
Figure 3:
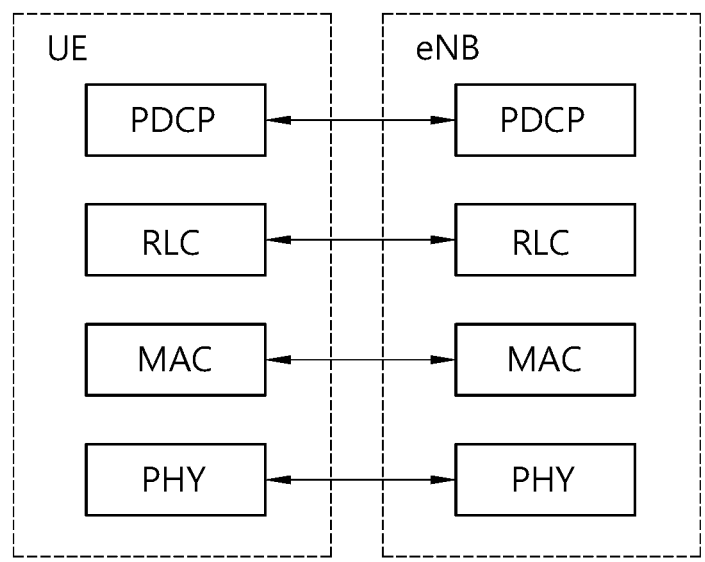
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belongs to an upper layer of the RRC layer and serves to perform session management, mobility management, or the like.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Meanwhile, the system information includes essential information that needs to be known by the UE in order for the UE to access the eNB. Accordingly, the UE needs to have received all pieces of system information before accessing the eNB, and needs to always have the up-to-date system information. In addition, the eNB periodically transmits the system information because the system information is information that needs to be known by all UEs within one cell.

The system information may be divided into a Master Information Block (MIB), a Scheduling Block (SB), and a System Information Block (SIB). The MIB allows the UE to know a physical configuration (e.g., bandwidth) of a corresponding cell. The SB reports transmission information (e.g., a transmission period or the like) of SIBs. The SIB includes only information of a neighbor cell, and another SIB includes only information of an uplink radio channel used by the UE.

Hereinafter, RRC state of UE and RRC connection method is described below.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

In order to manage the mobility of the terminal in the NAS layer positioned on the control planes of the terminal and the MME, an EPS mobility management (EMM) registered state and an EMM deregistered state may be defined. The EMM registered state and the EMM deregistered state may be applied to the terminal and the MME. Like a case of turning on the power of the terminal for the first time, an initial terminal is in the EMM deregistered state and the terminal performs a process of registering the terminal in the corresponding network through an initial attach procedure in order to access the network. When the attach procedure is successfully performed, the terminal and the MME is transitioned to the EMM registered state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, a mobility of the UE is managed by the command of the network. If a location of the UE in the ECM-IDLE state becomes different from a location known to the network, the UE announces the location of the UE to the network through a tracking area update procedure.

A random access procedure may be divided into a contention-based random access procedure and a non-contention-based random access procedure. First, in the contention-based random access procedure, different UEs are permitted to simultaneously access an eNB using the same RACH preamble. Accordingly, a contention may occur. In order to process such a contention, an additional contention resolution step is required.

Figure 4:
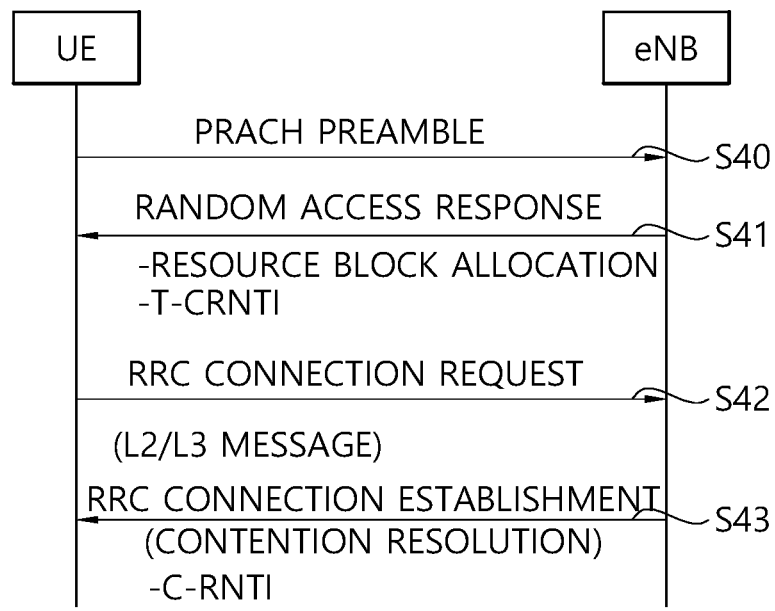
FIG. 4 shows a contention-based random access procedure.

FIG. 4 shows a contention-based random access procedure.

In S40, a UE transmits an RACH preamble to an eNB. The RACH preamble may be called a "message 1". The RACH preamble may include an RA-RNTI. The RA-RNTI may be determined as (1+t_id+10*f_id). t_id is the index of the first subframe of the specified physical random access channel (PRACH) (0≤t_id<10), and f_id is the index of the specified PRACH within that subframe, in ascending order of frequency domain (0≤f_id<6). The eNB may obtain the RA-RNTI by decoding the RACH preamble.

In S41, the eNB transmits a random access response (RAR) to the UE. The random access response may be called a "message 2". The random access response may include the RA-RNTI obtained by decoding the RACH preamble by the eNB, a TA, a temporary C-RNTI, and a resource block allocation (that is, an UL grant for an L2/L3 message). The UE may obtain the resource block allocation and a modulation and coding scheme (MCS) configuration by decoding the random access response. The eNB may be configured to receive an RRC connection request message through a DCI format 0.

In S42, the UE transmits an L2/L3 message, that is, an RRC connection request message, to the eNB. The RRC connection request message may be called a "message 3". The UE may transmit the RRC connection request message using the temporary C-RNTI obtained from the random access response.

In S43, in a case where the RRC connection request message transmitted by the UE has decoded successfully, the eNB transmits HARQ ACK to the corresponding UE. Accordingly, the UE may be aware that the random access procedure is successful. Such a process is called a contention resolution process. More specifically, the eNB transmits an RRC connection establishment message to the UE using the temporary C-RNTI in response to the RRC connection request message. The RRC connection establishment message may be called a "message 4". The RRC connection establishment message may include a C-RNTI. From this point of time, the UE and the eNB may exchange messages using the C-RNTI.

When the UE has not received the HARQ ACK, the UE may return to S40 and transmit the RACH preamble to the eNB.

In a non-contention-based random access procedure, a contention is not permitted for a reason of timing restriction.

An eNB may indicate when each UE transmits what RACH preamble. To this end, a UE has to be in a connected state (RRC_CONNECTED) prior to the random access procedure. For example, a non-contention-based random access procedure may be performed during handover. In the non-contention-based random access procedure, first, an eNB transmits an RACH preamble allocation to a UE. The UE transmits to the eNB an RACH preamble including an RA-RNTI and an indication of the size of an L2/L3 message based on the received RACH preamble allocation. The eNB that has received the RACH preamble transmits to the UE a random access response including a timing advance (TA), a C-RNTI, and an UL grant for an L2/L3 message. Accordingly, the non-contention-based random access procedure may be completed.

A UE may perform a random access procedure in the following cases: 1) a case where the UE performs initial access without RRC connection with an eNB, 2) a case where the UE first accesses a target cell in a handover process, 3) a case where a request is made by a command from an eNB, 4) a case where uplink data is created in a state in which uplink time synchronization is not aligned or a designated radio resource used for requesting a radio resource is not allocated, and 5) a case where a recovery process is performed when a radio link failure or handover failure is generated.

Hereinafter, a 5G network structure is described.

Figure 5:
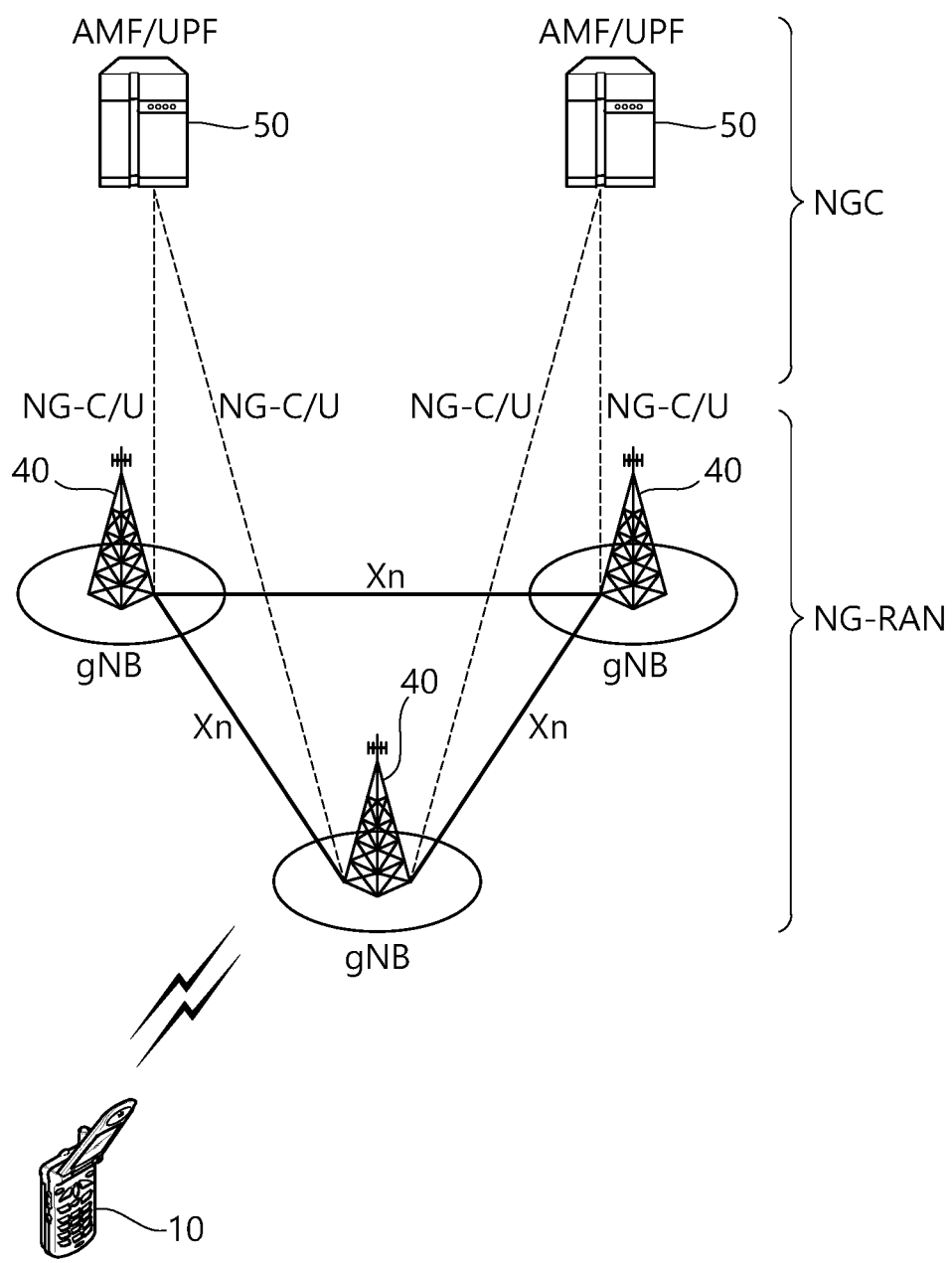
FIG. 5 shows a structure of a 5th generation (5G) system.

FIG. 5 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 5, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NGC interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC_INACTIVE state of a UE is described.

In the discussion on the NR standardization, an RRC_INACTIVE state (RRC inactive state) has been newly introduced in addition to the existing RRC_CONNECTED state and RRC_IDLE state. The RRC_INACTIVE state may be a concept similar to a lightly connected mode or lightweight connection mode which is under discussion in LTE. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG2 interface between a gNB and am NGC or an S1 interface between an eNB and an EPC may be maintained. In the RRC_INACTIVE state, a core network recognizes that the UE is normally connected to a BS. The RRC_INACTIVE state and a lightly connected mode may be considered as practically identical.

Hereinafter, beamforming will be described.

A beamforming technology using multiple antennas may be broadly divided into an analog beamforming technology (hereinafter, "analog beamforming") and a digital beamforming technology (hereinafter, "digital beamforming") depending on where a beamforming weight vector or precoding vector is applied.

Figure 6:
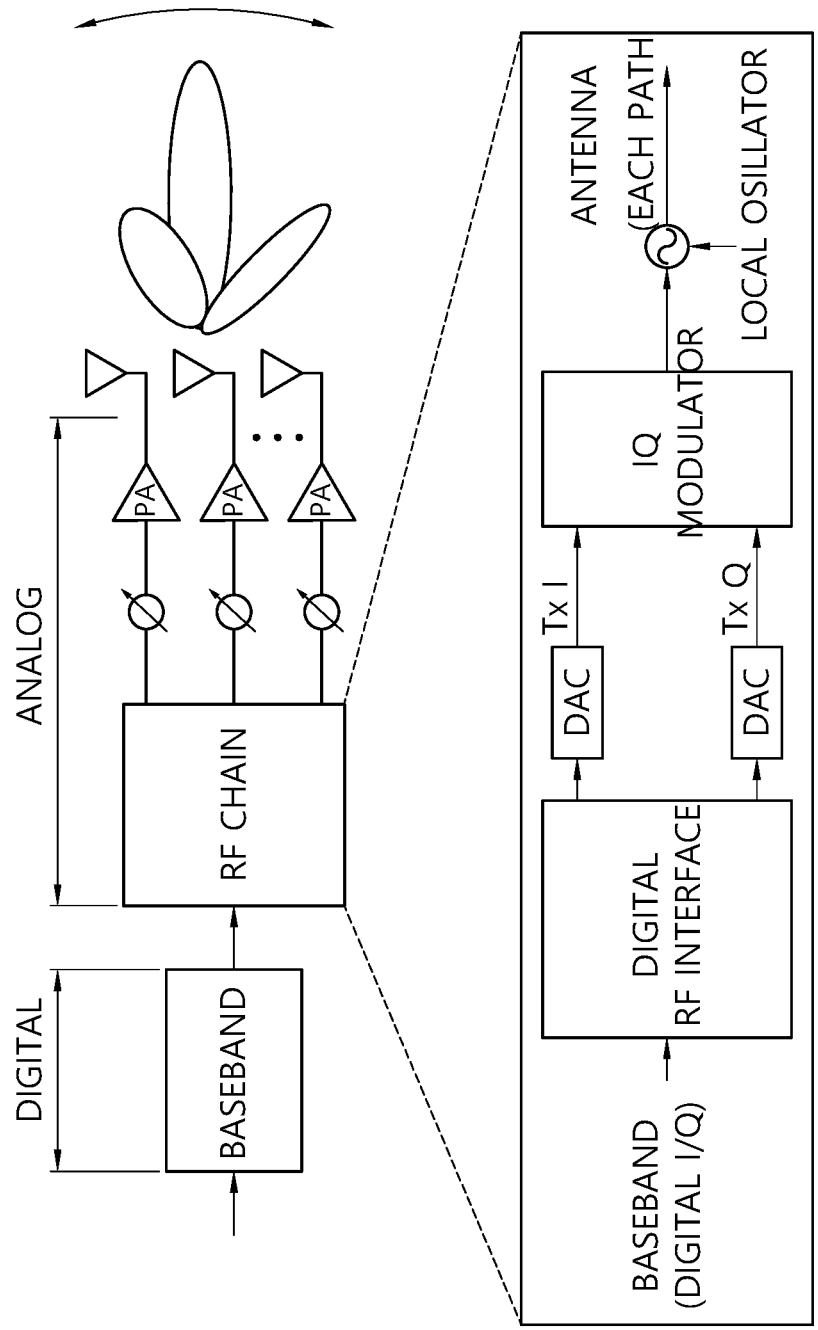
FIG. 6 shows an example of analog beamforming.

FIG. 6 shows an example of analog beamforming.

The analog beamforming is a typical beamforming technique applied to earlier multi-antenna structures. In the analog beamforming, a beam is formed by partitioning an analog signal, produced by digital signal processing, into a plurality of paths and configuring phase shift (PS) and power amplifier (PA) settings for each path. Referring to FIG. 6, in the analog beamforming, an analog signal derived from a single digital signal is processed by the PS and PA connected to each antenna. That is, the PS and the PA handle a complex weight in an analog stage. Herein, an RF chain refers to a processing block that converts a baseband signal into an analog signal. In the analog beamforming, beam precision is determined by characteristics of elements of the PS and PA, and is advantageous for narrowband transmission according to control characteristics of the elements. Meanwhile, a hardware structure makes it difficult to implement multi-stream transmission, thus making a multiplexing gain for higher data rates relatively small and making it difficult to form a beam per user based on orthogonal resource allocation.

Figure 7:
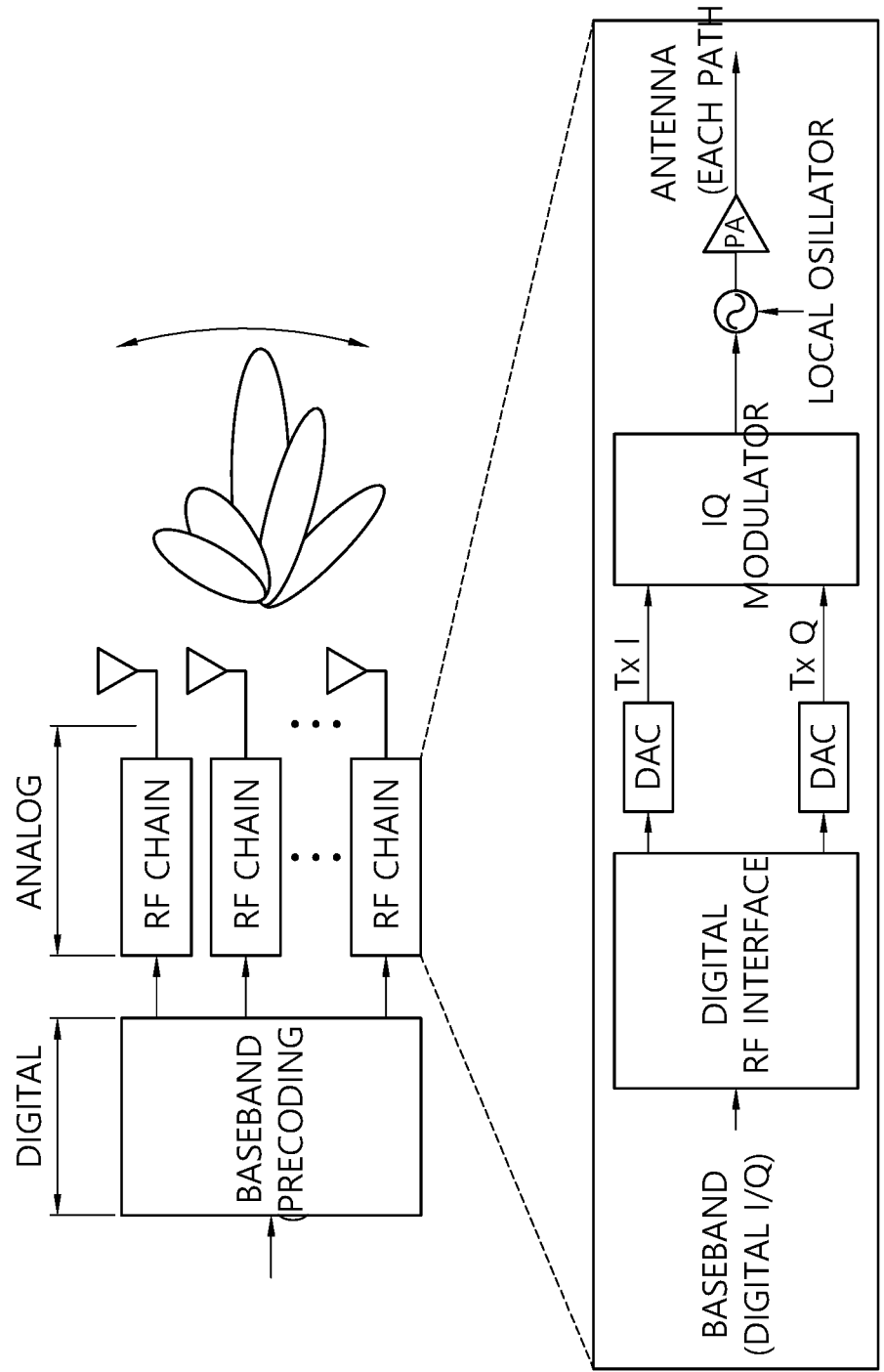
FIG. 7 shows an example of digital beamforming.

FIG. 7 shows an example of digital beamforming.

The digital beamforming differs from the analog beamforming in that a beam is formed in a digital stage by using baseband processing to maximize diversity and multiplexing gain in a MIMO environment. Referring to FIG. 7, the beam may be formed by performing precoding in the baseband processing. An RF chain may include a PA. Accordingly, a complex weight derived for beamforming may be directly applied to transmitted data. The digital beamforming may support simultaneous multi-user beamforming because a different beam may be formed for each user. Moreover, the digital beamforming allows for forming an independent beam for each user to whom an orthogonal resource is allocated, thus providing high scheduling flexibility and enabling to operate the transmitting end according to a system purpose. In addition, the digital beamforming allows for forming an independent beam per subcarrier when a technology such as MIMO-OFDM is used in a broadband transmission environment. Thus, the digital beamforming may optimize a maximum data rate of a single user on the basis of increased system capacity and enhanced beam gain. Therefore, digital beamforming-based MIMO technology was adopted to 3G/4G systems.

Meanwhile, a massive multiple-input multiple-output (MIMO) environment with a significantly increased number of transmit-receive antennas may be considered. For a typical cellular system, it is assumed that up to 8 transmit-receive antennas are used in an MIMO environment, whereas scores or even hundreds of transmit-receive antennas may be used in the massive MIMO environment. When conventional digital beamforming is used in the massive MIMO environment, since digital signal processing should be performed for hundreds of transmit antennas through baseband processing, the complexity of signal processing increases considerably, and since as many RF chains as the number of transmit antennas are required, the complexity of hardware implementation increases considerably. Moreover, independent channel estimation is needed for every transmit antenna, and a frequency division duplex (FDD) system requires feedback information for massive MIMO channels of all antennas, thus considerably increasing pilot and feedback overhead. In contrast, when conventional analog beamforming is used in the massive MIMO environment, the hardware complexity at a transmitting end is relatively low, but the performance increase through the use of a plurality of antennas is only slight and flexibility of resource allocation is reduced. In particular, in broadband transmission, it is very hard to perform beam control for each frequency.

Accordingly, the massive MIMO environment requires hybrid beamforming, which is a combination of the analog beamforming and the digital beamforming, rather than using either the analog beamforming or the digital beamforming as a beamforming technology. That is, a hybrid-type transmitting end structure may be needed so as to lower the complexity of hardware implementation at the transmitting end according to characteristics of the analog beamforming and to maximize a beamforming gain using a large number of transmit antennas according to characteristics of the digital beamforming.

Figure 8:
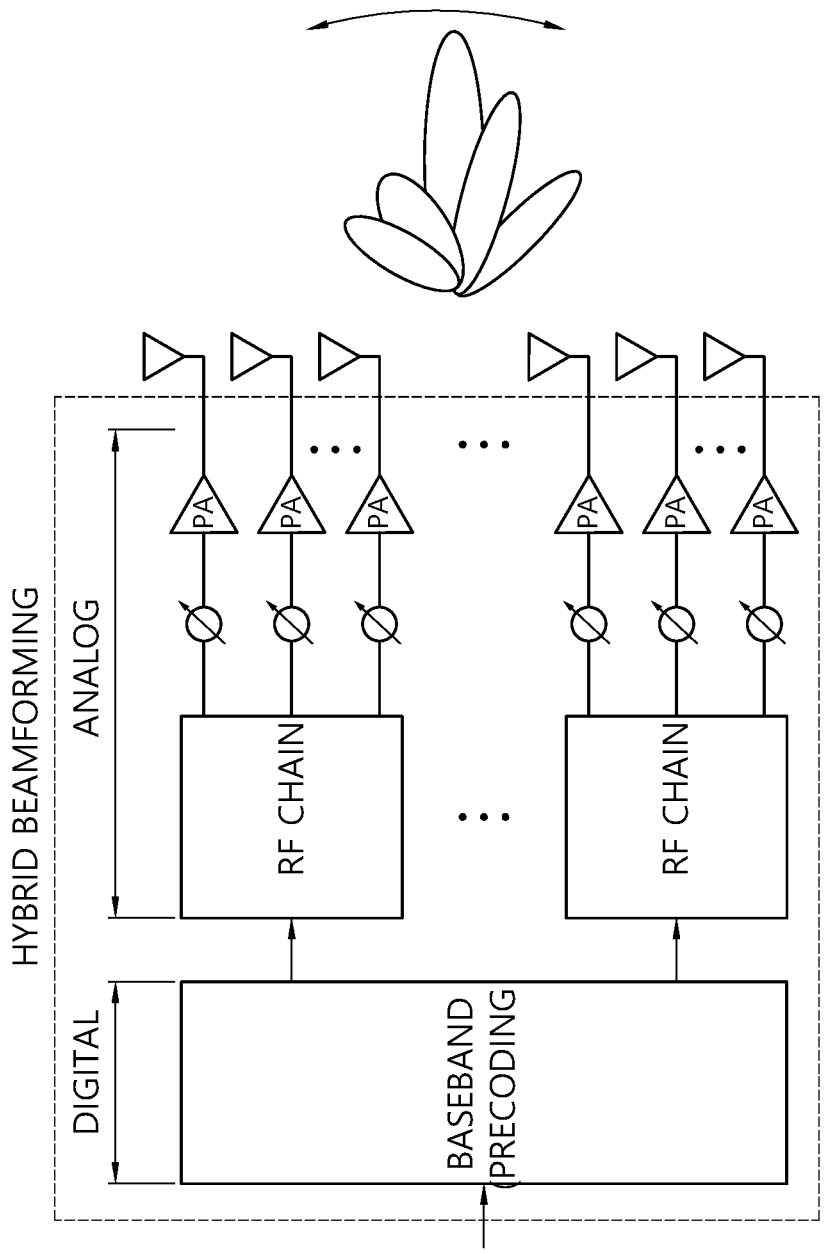
FIG. 8 shows an example of hybrid beamforming.

FIG. 8 shows an example of hybrid beamforming.

As described above, the hybrid beamforming is aimed at configuring a transmitting end capable of taking advantages of analog beamforming and digital beamforming in a large MIMO environment. Referring to FIG. 8, the hybrid beamforming basically forms a coarse beam through the analog beamforming and forms a beam for multiple streams or multi-user transmission through the digital beamforming. That is, the hybrid beamforming may have a structure for simultaneously taking the analog beamforming and the digital beamforming in order to lower the implementation complexity or the hardware complexity of the transmitting end.

In order to achieve a high data rate, a super high frequency (millimeter wave (mmW)) band is considered in a new RAT. Since the super high frequency band has a short wavelength, a plurality of antennas can be installed in the same area. For example, since the wavelength is 1 cm in the 30 GHz band, a total of 100 antenna elements can be installed at 0.5-lambda intervals and as a 2-dimension array on a panel having a breadth of 5 cm and a length of 5 cm. If the plurality of antenna elements are used in the super high frequency band, the coverage can be increased and the throughput can be improved by the increase of the beamforming gain.

Meanwhile, a UE may use a beam in order to perform a random access procedure in the NR. Specifically, the UE may select a beam for transmitting the message 1 (that is, random access preamble) or the message 3 (that is, PUSCH transmission or RRC connection request message corresponding to random access response). In this case, it is important to select an appropriate beam for performing the random access procedure successfully as quickly as possible.

Hereinafter, a method for performing a random access procedure according to an embodiment of the present disclosure is described. According to an embodiment of the present disclosure, the UE may perform an access attempt at least once by transmitting one or more random access preambles using one or more beams. The UE may receive a random access response corresponding to the random access preamble or transmit the random access preamble until it is determined that contention resolution is successful. The successful contention resolution refers to a case where a series of processes of transmitting the HARQ ACK (that is, message 4) to the corresponding UE is performed successfully when the BS successfully decodes the RRC connection request message received from the UE. In a case where the UE transmits the random access preamble in N access attempts, but the UE does not receive a random access response corresponding to the random access preamble or it is not determined that the contention resolution is successful, the UE may reselect a beam in a subsequent access attempt (N+1$^{th}$) and transmit the random access preamble via the reselected beams. In the embodiment, the UE may select M beams with high quality and transmit the random access preamble via the selected M beams. Here, an operation of transmitting the random access preamble using the M beams may be considered as one access attempt. In a case where the UE performs N access attempts, but the UE does not receive a random access response corresponding to the transmitted random access preamble or it is not determined that the contention resolution is successful, a magnitude of M may be adjusted and M beams may be reselected. Thereafter, the UE may transmit one or more random access preambles using the reselected beams in the N+1$^{th}$ access attempt. In addition, the UE may perform the access attempt by a set number of times (N times) until the UE receives a random access response corresponding to the transmitted random access preamble or it is determined that the contention resolution is successful.

As an example, a random access procedure may be initiated in a case where the UE first accesses a target cell in a handover process. In addition, the random access procedure may be divided into a non-contention-based random access procedure and a contention-based random access procedure. In the case of the non-contention-based random access, the BS may indicate when each UE transmits what random access preamble via what beam. The indicated beam by the BS in the non-contention-based random access procedure may be determined based on the measurement results of the target cell from a source cell by the UE. However, whether the beam indicated by the BS in the non-contention-based random access procedure still has the most superior quality is not ensured when the UE moves to the target cell, that is, even when a predetermined time is elapsed after measuring the target cell. In this case, as the non-contention-based random access procedure is not smoothly performed, the random access procedure may be converted into the contention-based random access procedure, and in the contention-based random access procedure, the UE is required to select the most adequate beam to transmit the random access preamble. Meanwhile, in the example described above, the contention-based random access procedure may be initiated from the start of the handover process.

In the description, the UE may adjust M by increasing or decreasing the magnitude of M. That is, the UE may increase or decrease M by a constant magnitude (delta). Here, the amount of the delta may be signaled to the UE by the BS (gNB or eNB). Meanwhile, the number of beams M1 before adjustment, the number of beams M2 after adjustment, and a difference between M1 and M2 may be signaled to the UE by the BS. A magnitude of M1 may be small than that of M2. In addition, the magnitude of M1 may be greater than that of M2. Further, the magnitude of M1 may be equal to that of M2. Meanwhile, N described above is an integer of 1 or more and may be signaled to the UE by the BS.

Hereinafter, a method for performing a random access procedure according to an embodiment of the present disclosure will be described with reference to FIG. 9. In the embodiment, the UE may measure Reference Signal Received Power (RSRP) or Reference Signal Received Quality (RSRQ) of a service cell.

In S902, the UE may receive RACH configuration information related to a beam from a network. The RACH configuration information may include information related to the number M of beams used for transmitting the random access preamble. Specifically, the RRC layer of the UE receives the RACH configuration information and the MAC layer of the UE may perform configuration related to RACH. According to an embodiment, the UE may set a plurality of values of M based on the RACH configuration information received from the BS.

In S904, the UE may select M beams having superior quality of the serving cell. As an example, the UE may select M beams in order of superior quality. Here, the quality of the beam may be measured based on RSRP or RSRQ. Meanwhile, in a case where the number of values of M is plural, the UE may preferentially select M having the smallest magnitude.

In S906, the UE may set a counter to 1. The UE may transmit the random access preamble using Physical Random Access Channel (PRACH) resources corresponding to the selected beams. The random access preamble may include a random access preamble identity (RAPID) for identifying the random access preamble.

In S908, the UE may monitor a random access response using the selected beam or the beam used in the transmission of the random access preamble.

In S910, in a case where the UE does not receive the random access response, the UE may transmit one or more random access preambles using the PRACH resources corresponding to the selected beams. In particular, in a case where the number of the selected beams is plural, the UE may transmit the random access preamble using the respective beams at least once. However, a method of determining the number of times and order in which each beam is used is not particularly limited. That is, in a case where the UE does not receive the random access response or the contention resolution is not performed successfully, the UE transmits the random access preamble by a set number of times (that is, the maximum value of the counter), such that the UE performs the access attempts and each of the access attempt may be performed based on the plurality of selected beams. Whenever the UE does not receive the random access response corresponding to the transmitted random access preamble or it is determined that the contention resolution is not performed successfully, the UE may perform an access attempt by transmitting one or more random access preambles using the selected beams. In addition, the UE may increase the magnitude of the counter by 1 whenever transmitting the random access preamble.

In S912, in a case where the magnitude of the counter is equal to the maximum value of the counter (MAX_COUNTER), the UE may adjust a value of M. Specifically, the UE may select M having the second smallest value among the plurality of values of M. That is, the UE may adjust the magnitude of M by increasing the value of M by a constant magnitude. Meanwhile, the maximum value of the counter is an integer of 1 or more and may be selected by the BS.

In S914, the UE may reselect a beam based on the adjusted M. According to an embodiment, M is adjusted so that a value of M is increased, such that the UE may reselect a larger number of beams than previous one. In this case, the UE may also reselect beams based on RSRP or RSRQ.

In S916, the UE may transmit a random access preamble using a PRACH resource corresponding to the reselected beam. The UE may reset the counter to 1.

In S918, the UE may monitor a random access response using the reselected beam or the beam used in the transmission of the random access preamble.

In S920, in a case where the UE does not receive the random access response, the UE may transmit a random access preamble again using the PRACH resource corresponding to the reselected beam. Whenever the UE does not receive the random access response corresponding to the transmitted random access preamble or it is determined that the contention resolution is not performed successfully, the UE may perform an access attempt by transmitting one or more random access preambles using the selected beams. In addition, the UE may increase the counter by 1 whenever transmitting the random access preamble.

In the procedure described above, in a case where the UE does not receive the random access response corresponding to the transmitted random access preamble or it is determined that the contention resolution is not performed successfully, the UE may repeat S912.

In S922, the UE may receive a random access response corresponding to the random access preamble. The random access response may include a random access preamble identity corresponding to the random access preamble.

In S924, the UE may transmit the message 3 using a UL grant included in the random access response. According to an embodiment, the UE may also use the selected beams when transmitting the message 3.

In S926, the BS may transmit to the UE the message 4 indicating that the contention resolution is finished successfully. The message 4 may be an RRC connection establishment message.

Figure 9:
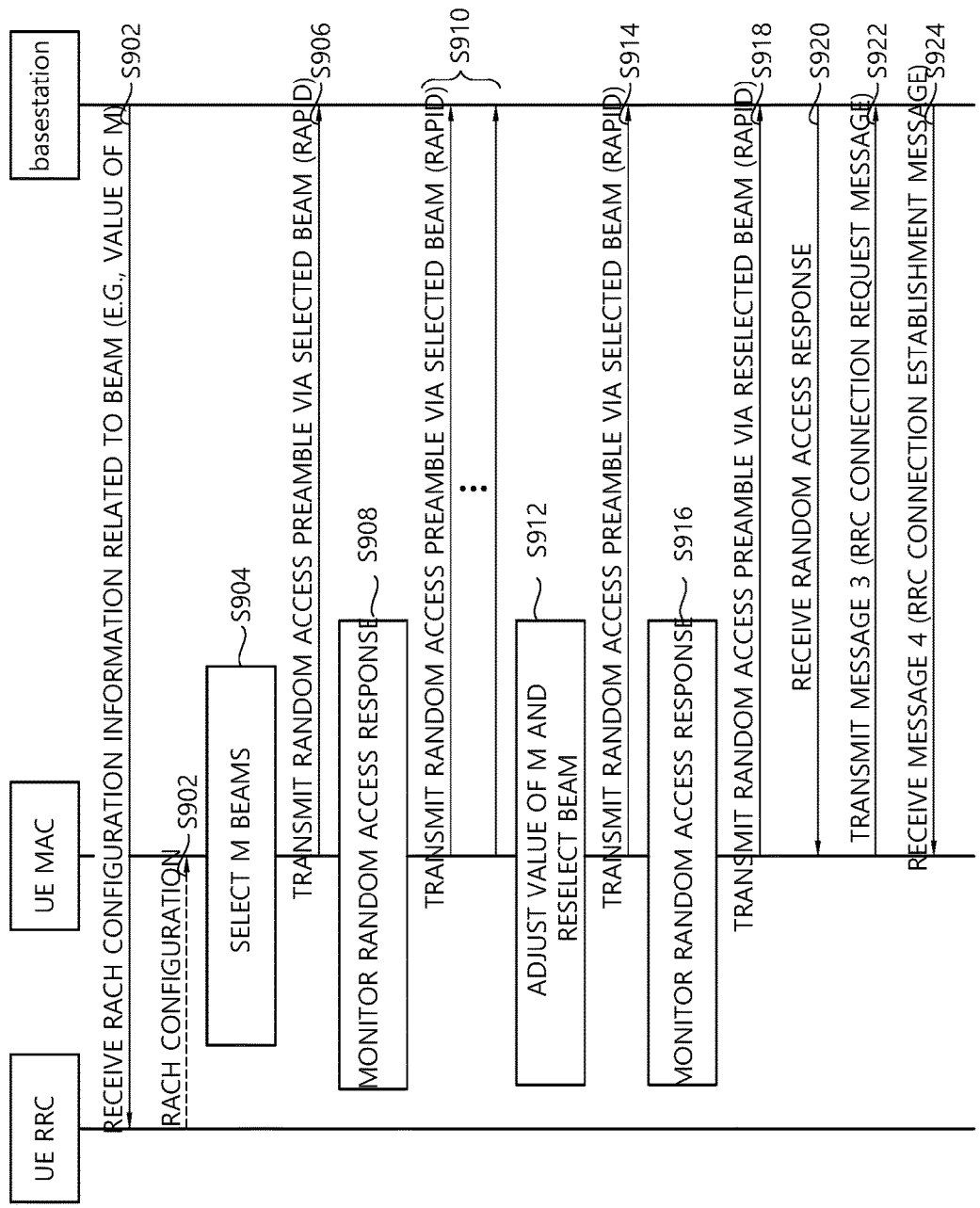
FIG. 9 is an exemplary diagram showing a method for performing a random access procedure according to an embodiment of the present disclosure.

Meanwhile, S904 to S924 of FIG. 9 may be performed by an MAC entity of the UE.

Figure 10:
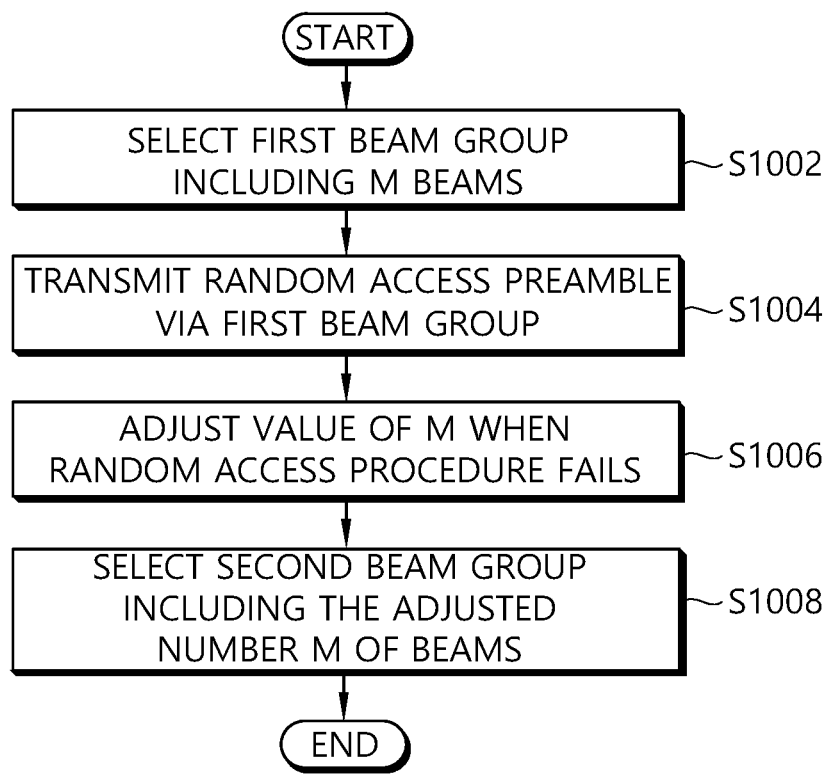
FIG. 10 is flowchart for describing a method for performing a random access procedure according to an embodiment of the present disclosure.

FIG. 10 is flowchart for describing a method for performing a random access procedure according to an embodiment of the present disclosure.

In S1002, the UE may select a first beam group including a set number M of beams. In S1004, the UE may transmit a random access preamble to the BS via the first beam group. In S1006, in a case where it is determined that the random access procedure fails, the UE may adjust a value of M. In S1008, the UE may reselect a second beam group including the adjusted number M of beams.

Thereafter, the UE may transmit the random access preamble to the BS via the second beam group. The case where it is determined that the random access procedure fails may be any one of a case where a response corresponding to the random access preamble is not received while the random access preamble is transmitted by a set number of times or a case where it is determined that a contention resolution is not performed successfully. The threshold value may be a value related to Reference Signal Received Power (RSRP) or Reference Signal Received Quality (RSRQ). The UE may transmit the random access preamble using each of beams included in the first beam group at least once. The UE may adjust the value of M so that a magnitude of M is increased. The UE may further include receiving of configuration information related to a plurality of values of M from the base station, and may adjust the value of M so that a magnitude of M is increased. Meanwhile, the base station may be a base station of a target cell for which handover is to be performed.

Figure 11:
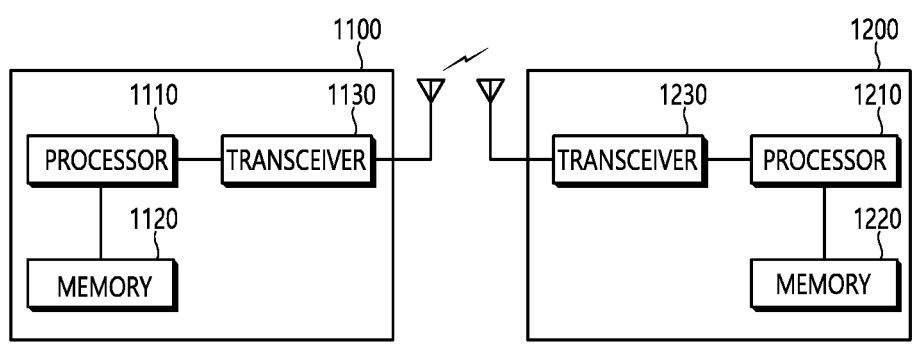
FIG. 11 shows a wireless communication system implementing an embodiment of the present disclosure.

FIG. 11 shows a wireless communication system implementing an embodiment of the present disclosure.

A UE 1100 includes a processor 1110, a memory 1120, and a transceiver 1130. The memory 1120 is connected to the processor 1110 and stores a variety of information to operate the processor 1110. The transceiver 1130 is connected to the processor 1110, and transmits and receives a radio signal to and from a network node 1200.

The processor 1110 may be configured to implement functions, procedures, and/or methods described herein. More specifically, the processor 1110 may control the transceiver 1130 to perform S902 to S924 of FIG. 9. The processor 1110 may control the transceiver 1130 to perform S1002 to S1008 of FIG. 10.

The network node 1200 includes a processor 1210, a memory 1220, and a transceiver 1230. The network node 1200 may be any one of eNB, gNB, ng-eNB, or en-gNB. The network node 1200 may be any one of MN or SN described above. The memory 1220 is connected to the processor 1210 and stores a variety of information to operate the processor 1210. The transceiver 1230 is connected to the processor 1210, and transmits and receives a radio signal to and from the UE 1100.

The processors 1110 and 1210 may include an application-specific integrated circuit (ASIC), another chipset, a login circuit, and/or a data processing device. The memories 1120 and 1220 may include a read-only memory (ROM), a random access memory (RAM), a flash memory, a memory card, a storage medium, and/or another storage device. The transceivers 1130 and 1230 may include a baseband circuit for processing a radio frequency signal. When the embodiment is implemented in software, the method described above may be implemented with a module (procedure, function, and the like) for performing the functions described above. The module may be stored in the memories 1120 and 1220 and may be performed by the processors 1110 and 1210. The memories 1120 and 1220 may be located inside or outside the processors 1110 and 1210, respectively, and may be connected to the processors 1110 and 1210 by using various well-known means, respectively.

Figure 12:
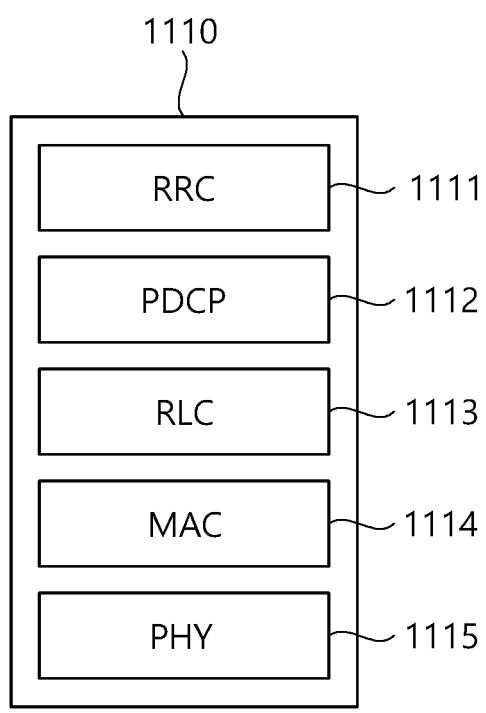
FIG. 12 shows the processor of the user equipment (UE) shown in FIG. 11.

FIG. 12 shows the processor of the user equipment (UE) shown in FIG. 11. An RRC layer 1111, a PDCP layer 1112, an RLC layer 1113, an MAC layer 1114, and a physical layer 1115 may be implemented by the processor 1110. The RRC layer 1111 may be configured to implement functions, procedures, and/or methods of the processor 1110.

Figure 13:
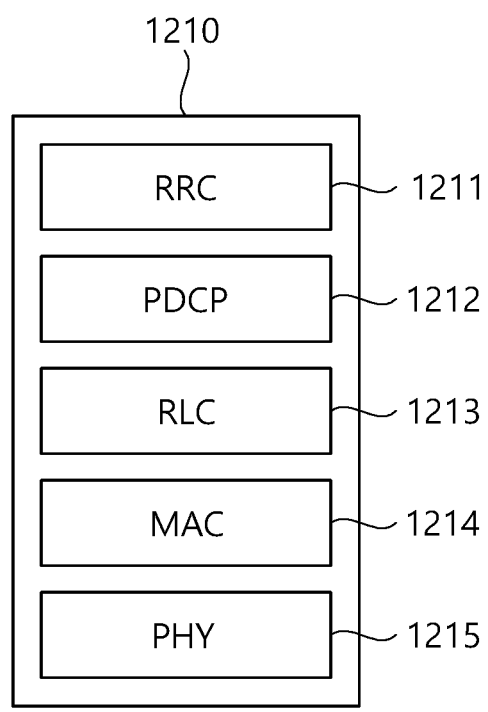
FIG. 13 shows the processor of the network node shown in FIG. 11.

FIG. 13 shows the processor of the network node shown in FIG. 11. An RRC layer 1211, a PDCP layer 1212, an RLC layer 1213, an MAC layer 1214, and a physical layer 1215 may be implemented by the processor 1210. The RRC layer 1211 may be configured to implement functions, procedures, and/or methods of the processor 1210.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for performing a random access procedure in a wireless communication system, the method comprising:
   selecting a first beam group including a set number of M beams;
   transmitting a random access preamble to a base station via the first beam group;
   adjusting the first beam group to a second beam group based on a determination that the random access procedure failed, wherein failure of the random access procedure is related to M access attempts based on the set number of M beams;

reselecting the second beam group including a set number of N beams; and transmitting the random access preamble to the base station via the second beam group, wherein M is different from N.

2. The method of claim 1, wherein the random access procedure is determined to have failed based on any one of a response to the random access preamble has not been received after the random access preamble has been transmitted a set number of times or it is determined that a contention resolution has not been performed successfully.

3. The method of claim 1, wherein a threshold value is a value related to Reference Signal Received Power (RSRP) or Reference Signal Received Quality (RSRQ).

4. The method of claim 1, wherein transmitting the random access preamble comprises:

transmitting the random access preamble on each of the M beams included in the first beam group at least once.

5. The method of claim 1, further comprising:

receiving first configuration information related to a plurality of values of M from the base station, and receiving second configuration information related to a plurality of values of N from the base station.

6. The method of claim 1, wherein the base station is a base station of a target cell for which handover is to be performed.

7. The method of claim 1, wherein the method is performed by a terminal, and wherein the terminal communicates with at least one of a mobile terminal, a network or autonomous vehicles other than the terminal.

8. A terminal configured to perform a random access procedure in a wireless communication system, the terminal comprising:

a memory;

a transceiver; and a processor operationally connecting the memory and the transceiver to each other, wherein the processor is configured to:

select a first beam group including a set number of M beams;

transmit a random access preamble to a base station via the first beam group;

adjust the first beam group to a second beam group based on a determination that the random access procedure failed, wherein failure of the random access procedure is related to M access attempts based on the set number of M beams;

reselect the second beam group including a set number of M beams; and transmit the random access preamble to the base station via the second beam group, wherein M is different from N.

9. The terminal of claim 8, wherein the random access procedure is determined to have failed based on any one of a response to the random access preamble has not been received after the random access preamble has been transmitted a set number of times or it is determined that a contention resolution has not been performed successfully.

10. The terminal of claim 8, wherein a threshold value is a value related to Reference Signal Received Power (RSRP) or Reference Signal Received Quality (RSRQ).

11. The terminal of claim 6, wherein the processor is further configured to transmit the random access preamble on each of the M beams included in the first beam group at least once.

12. The terminal of claim 8, the processor is further configured to receive first configuration information related to a plurality of values of M from the base station, and receive second configuration information related to a plurality of values of N from the base station.

* * * * *